: US 10,493,568 B2
(45) Date of Patent: Dec. 3, 2019

(12) United States Patent
Goncharov et al.

(54) DUCTILE BORON BEARING NICKEL BASED WELDING MATERIAL

(71) Applicant: Liburdi Engineering Limited, Dundas (CA)

(72) Inventors: Alexander B. Goncharov, Toronto (CA); Joseph Liburdi, Dundas (CA); Paul Lowden, Cambridge (CA)

(73) Assignee: Liburdi Engineering Limited, Dundas, Ontario ( * ) Notice: Subject to any disclaimer, the term of this patent is extended or adjusted under 35 U.S.C. 154(b) by 0 days.

(21) Appl. No.: 14/834,840

(22) Filed: Aug. 25, 2015

(65) Prior Publication Data

US 2016/0107269 A1 Apr. 21, 2016

Related U.S. Application Data

(63) Continuation of application No. PCT/CA2014/000752, filed on Oct. 21, 2014.

(51) Int. Cl.
*C22C 19/05* (2006.01)
*B23K 35/30* (2006.01)
*B23K 35/02* (2006.01)

(52) U.S. Cl.
CPC ........ B23K 35/304 (2013.01); B23K 35/0227 (2013.01); B23K 35/0233 (2013.01); B23K 35/0244 (2013.01); B23K 35/0255 (2013.01); B23K 35/0261 (2013.01); C22C 19/055 (2013.01)

(58) Field of Classification Search
CPC .......................... C22C 19/055; B23K 35/304; B23K 35/0261; B23K 35/0227; B23K 35/0244
See application file for complete search history.

(56) References Cited

U.S. PATENT DOCUMENTS 3,228,095 A 1/1966 Raymond et al.
2012/0267420 A1 10/2012 Cheney

FOREIGN PATENT DOCUMENTS

| CN | 103635284 A | 3/2014 | |
|---|---|---|---|
| JP | S51009036 | 4/1979 | |
| JP | S55122848 | 9/1980 | |
| JP | S55161042 | 8/1983 | |
| JP | S58159993 | 9/1983 | |
| JP | 2006009052 | 12/2018 | |
| WO | WO 2012129505 A1 * | 9/2012 | ............... B22F 5/12 |

OTHER PUBLICATIONS

Office Action, CN 201480013693.6, dated May 30, 2018.
Office Action, JP 2017-508716, dated Jun. 19, 2018.
Office Action, CA 2902152; dated Feb. 15, 2018.
Office Action, CN 201480013693.6, dated Jan. 23, 2019.
EESR; EP 14891039.1; Jun. 9, 2017.

\* cited by examiner

*Primary Examiner* — Jessee R Roe
(74) *Attorney, Agent, or Firm* — Ridout & Maybee LLP

(57) ABSTRACT

A ductile boron bearing nickel based welding material which includes boron within the range of 0.4-0.6 wt. % B, carbon from a trace amount to 0.04 wt. % C, 17-23 wt. % Cr, 0.35-10 wt. % Mo, 0.1-4.15 wt. % Nb with nickel or iron and impurities to balance for manufacturing of welding and brazing wires, powders and foils used in the repair of various articles made of nickel, cobalt and iron based alloys.

13 Claims, 4 Drawing Sheets

DUCTILE BORON BEARING NICKEL BASED WELDING MATERIAL

The present application is a national stage entry of international application PCT/CA2014/000752 which claims priority from regularly filed U.S. utility patent application Ser. No. 14/263,120 filed Apr. 28, 2014 under the title; Welding material for Welding Superalloys in the name of Liburdi Engineering Limited.

Nickel Chromium alloy 625 which includes nominally 20-23 wt. % Cr, 8-10 wt. % Mo, 3.15-4.15 wt. % Nb, maximum 0.1 wt. % C and nickel with impurities to balance, also known as INCONEL® 625 (IN625) manufactured to AMS 5879, has good oxidation resistance at temperatures up to 1800° F., mechanical properties up to 1598° F. and provides good resistance to aqueous corrosion. As a result, this alloy has been widely used in aerospace, chemical and power generation industries for decades.

Also, due to unique metallurgical properties Inconel® 625 (IN625) manufactured as per AMS 5837 in a form of welding wire and rods has been used for repair of turbine engine components by Gas Tungsten Arc Welding (GTAW), laser, electron beam and plasma welding and cladding. Solution hardening IN625 alloy has a high ductility due to a balanced chemical composition, wherein up to 0.1 wt. % of carbon did not affect ductility. Therefore, there were no metallurgical needs for further costly purification of this alloy that could increase the price of this widely used welding wire. As a result, typical content of carbon in IN625 welding wire available on the market varies from about 0.06 wt. % to about 0.1 wt. %.

IN625 produces sound welds but the heat affected zone (HAZ) of Inconel® 738, GTD 111, GTD 222, Inconel 713 and some other precipitation hardening superalloys with high content of gamma prime phase ($\gamma'$) is prone to micro cracking known also as microfissuring as per Banerjee K., Richards N. L., and Chaturvedi M. C. "Effect of Filler Alloys on Heat Affected Zone Cracking in Pre-weld Heat Treated IN-738 LC Gas-Tungsten-Arc Welds", Metallurgical and Materials Transactions, Volume 36A, July 2005, pp. 1881-1890.

Modification of Inconel 625 with boron reduced melting temperature and liquidation cracking in the HAZ of welds produced by laser clad on GTD 111 and Inconel 738 and GTD 111 nickel based superalloys as per A. Gontcharov, J. Liburdi, P. Lowden et al. "Self Healing Fusion Welding Technology", GT2014-26412, Proceedings of ASME Turbo Expo 2014: Turbine Technical Conference and Exposition, Jun. 16-20, 2014, Düsseldorf, Germany. These welds had elongation of 19.7% only at a temperature of 1800° F. that practically restricted use of drawing process for manufacturing of welding wire.

Therefore, additional improvement of boron modified Inconel 625 welding material was required to allow manufacturing of welding wire using standard drawing process without significant deviations from the standard chemical composition of Inconel 625. It is also an object of the concept that the welding wire should produce crack free welds on precipitation hardening superalloys, brazed and welded joints with yield strength and stress rupture properties exceeding relevant properties of standard Inconel 625 alloy.

BRIEF DESCRIPTION OF THE INVENTION

We have found that to achieve the required ductility for manufacturing of welding wire using standard drawing and extrusion processes, the content of carbon in nickel based alloy comprising of 0.4-0.6 wt. % of boron (B), 17-23 wt. % of chromium (Cr), 8-10 wt. % of molybdenum (Mo), 0.1-4.15 wt. % of niobium (Nb) should not exceed about 0.04 wt. % to avoid or minimize formation of carbides.

In addition to the above, the invented welding material produced crack free welds with superior yield strength, ductility and stress rupture properties that exceeded mechanical properties of welds produced using standard IN625 welding wire.

As per the preferable embodiment, the invented welding material can be manufactured in the form of welding and brazing wire, welding powder and foils.

The invented welding material can be used for joining and repair of various articles including turbine engine components manufactured of polycrystalline, directionally solidified and single crystal nickel, cobalt and iron based alloys.

Due to high ductility and reduced melting temperature of this alloy, the invented welding material can be used for TIG brazing and joining of materials produced by Wide Gap Brazing, Liburdi Powder Metallurgy techniques and also composite materials.

STANDARD ACRONYMS

Figure 1:
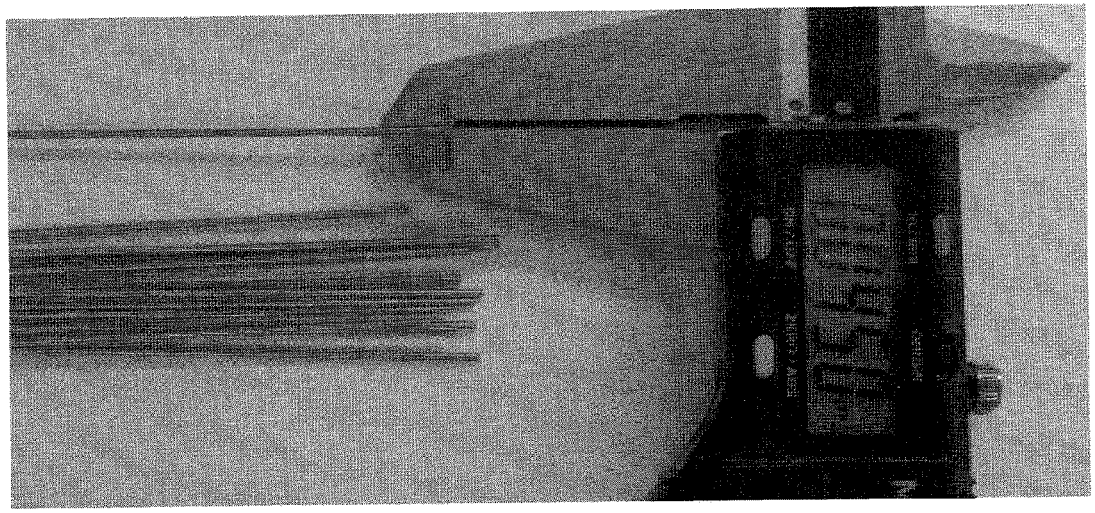
FIG. 1 is the photograph of welding wire cut to rods for GTAW-MA welding and TIG brazing.

AMS—Aerospace Material Specification (standards)
ASTM—American Society for Testing and Materials (standards)
AWS—American Welding Society (standards)
HAZ—Heat Affected Zone
NDT—Non Destructive Testing
PWHT—Post Weld Heat Treatment
RA—Reduction Area of the sample at tensile testing
UTS—Ultimate Tensile Strengths
IN625—Inconel 625 nickel based alloy
GTAW-MA—Gas Tungsten Arc Welding—Manual
GTAW-ME—Gas Tungsten Arc Welding—Machine
LBW—Laser Beam Welding
EBW—Electron Beam Welding
PAW—Plasma Arc Welding
TIG—Tungsten Inert Gas
WGB—Wide-Gap Brazing LPM™—Liburdi Powder Metallurgy process and trademark
HPT—High Pressure Turbine
Glossary of Terms
Amdry 775—diffusion braze alloy with a high chromium content which allows for tremendous oxidation and corrosion resistance, as well as containing boron as a melt suppressant, which provides for a homogeneous deposit.
Borides—compounds consisting of two elements of which boron is the more electronegative one. Boron form borides with metal and non-metal elements.
CMSX-4 material—an ultra-high strength, single crystal alloy
Dilution—the change in a chemical composition of a welding material caused by the admixture of the base material or previous weld metal in the weld bead that is measured by the percentage of the base metal or previous weld metal in the weld bead.
Ductility—ability of metals and alloys to be drawn, stretched, or formed without breaking.
Fissuring—small crack-like discontinuities with only slight separation (opening displacement) of the fracture surfaces. The prefixes macro- or micro-indicate relative size.
Gas Tungsten Arc Welding (GTAW)—in accordance with the AWS definition it is the arc welding process that produces coalescence of metals by heating them with an arc between a tungsten (non-consumable) electrode and the work also know as a base material. Shielding is obtained from a gas or a gas mixture. Pressure may or may not be used and filler metal may or may not be used.
GTD 111—nickel based superalloy developed by General Electric.
INCONEL 738—nickel based alloy that is vacuum-cast and precipitation-hardened
Laser Beam Welding and Cladding (LBW)—in accordance with AWS definition it is a welding process that produces coalescence of materials with the heat obtained from the application of concentrated coherent light beam impinging upon the joint or base material respectively.
Liquidation Cracking—small cracks caused by the melting of boundary constituents during the solidification of the liquidated material.
LPM Material—Material comprising braze based matrix and presented in a solid phase high temperature filler powders such as Mar M247, Inconel 738 and other.
MAR M-247—precipitation hardening high gamma prime nickel based superalloy.
Inconel 738—precipitation hardening high gamma prime nickel based superalloy.
Tungsten Inert Gas Brazing—welding method in which the arc is sustained by a tungsten electrode and inert gas is used to prevent the access of air.
Welding Powder—the welding material in a form of powder that is added in making of welded joints or clad welds.
Welding Rods—welding wire cut to a standardized length.
Welding Wire—welding material in a form of wire that is added in making of welded joints or clad welds.
Wide Gap Brazing Alloy—alloys with a component that melts at the brazing temperature and also a component which either partially melts or does not melt at the same temperature. This allows a "bridge" to be created between members.
Wide Gap Brazing Layer—providing a material covering over a substrate.

DETAILED DESCRIPTION OF THE INVENTION

The invented alloy can be used in a form of welding wires and powders as well in a form of various articles manufactured by casting, rolling, hot and cold forming and incorporated into these articles by replacing damaged sections during repairs.

Welding materials in a form of welding wire and powder are the major applications of the invented alloy and, therefore, are discussed in more detail below.

For a manufacturing of welding wire ingots, also known as billets of 0.5-3 inch in diameter are produced in vacuum or argon using standard induction, arc melting and re-melting technologies and equipment. After that billets are reduced to a required diameter by drawing or extrusion with preheating followed by standard surface finishing. Therefore, high ductility of the initial casting material is essential to minimize the process temperature for a successful manufacturing of welding wire by extrusion and drawing.

During final processing the wire is passed through a standard rigorous cleaning procedure that ensures the welding wire and welds produced using this wire are free from contamination.

After cleaning, the wire is cut to a required length for manufacturing of welding rods for a manual GTAW-MA or butt welded together and spooled for the automatic GTAW-ME, LBW, EBW and PAW welding.

Welding powder of 45-75 μm in diameter for laser and plasma cladding and welding is manufactured by a standard gas atomization process. During this process the melted alloy is atomized by inert gas jets into fine metal droplets, which cool down during their fall in the atomizing tower. Metal powders obtained by gas-atomization have a perfectly spherical shape and high cleanliness level.

During welding, powder and welding wire are fed into the welding pool that due to solidification are consolidated with the base material producing the weld metal with a chemical composition close to the chemical composition of the welding material. To reduce overheating and prevent HAZ cracking, welding and cladding are carried out with minimum dilution. The best results in cladding were achieved with a dilution of 5-15%.

As it was discovered within the scope of the current invention, boron within the specified range produced two beneficial effects for achieving the objectives of the current invention. First of all, boron in a combination with a specified content of carbon, increased ductility of the invented alloy within the temperature range of 1600-1800° F. allowing manufacturing of welding wire using standard drawing and extrusion processes.

Secondly, boron within the range of 0.4 to 0.6 wt. % reduced the melting temperature of welding material and overheating of the HAZ, thereby minimizing or excluding liquidation cracking of the base material in the HAZ of GTD 111 superalloy as shown in FIG. 1.

In addition to above, boron increases strength of welds due to formation of cuboidal borides, refer to Table 2 and 3.

Figure 3:
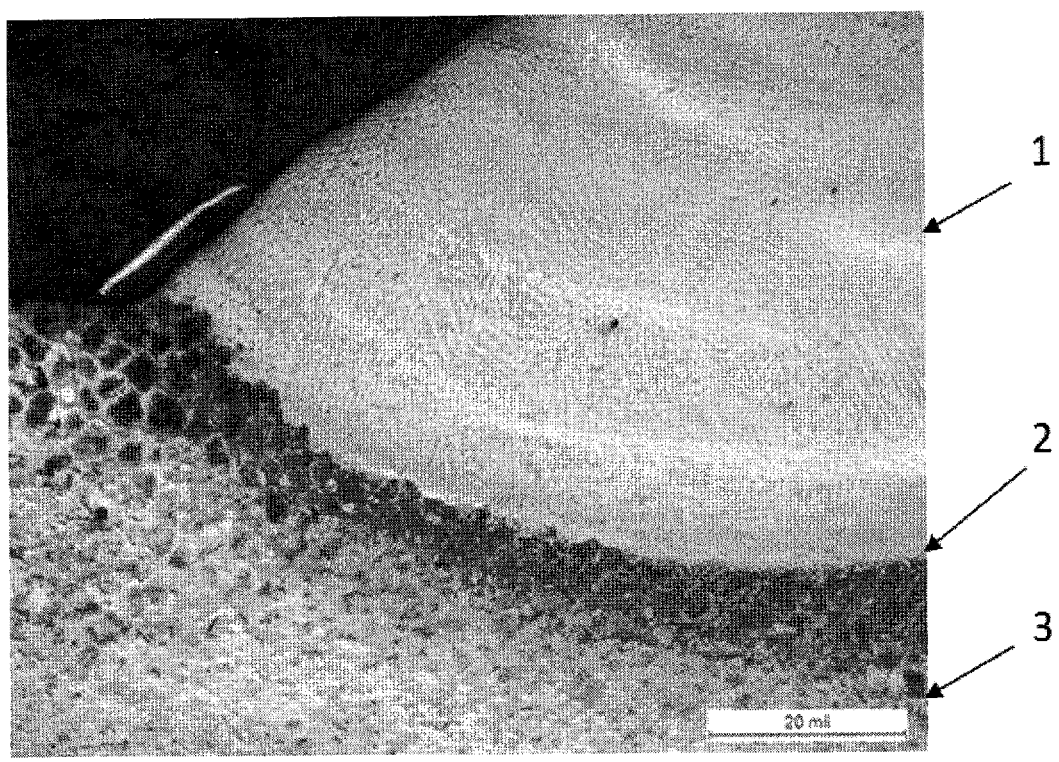
FIG. 3 is the macrograph of the clad weld that was produced on Mar M24—Amdry 775 Wide Gap Brazing Material applied to the surface of Inconel 738 superalloy, wherein 1 is the weld metal, 2 is the fusion line and 3 is the base material made of WGB.
Figure 4:
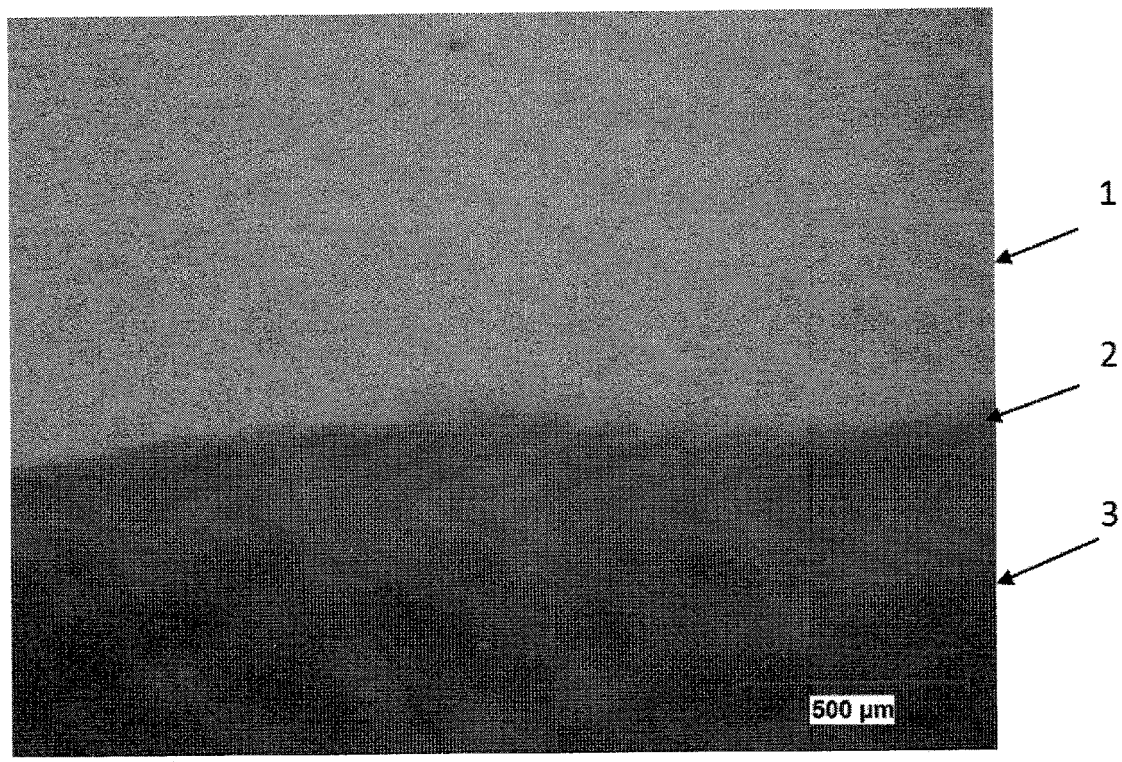
FIG. 4 is the micrograph of the clad weld on the CMSX-4 that depicts a crack free weld without any evidence of a recrystallization of the single crystal substrate, wherein 1 is the weld metal, 2 is the fusion line and 3 is base material manufacture of CMSX-4 single crystal alloy.

High ductility and reduced melting temperature of the invented welding material allows direct welding and TIG brazing on brazed joints and WGB materials as shown in FIG. 3. Also, welding and cladding using the invented welding material excludes cracking and recrystallization of single crystal material materials as shown in FIG. 4.

Examples of Welding Wire and Welds Produced on GTD 111 Alloys and WGB Brazed Material The invented alloy with the preferable chemical compositions shown in Table 1 designated as Alloy 1 and Alloy 2 as well as Alloy 3 with elevated content of carbon in the form of bars produced by the plasma arc melting in argon were subjected to tensile testing as per ASTM E-8, E-21 1200° F. and 1800° F. and stress rupture testing as per ASTM E-139 at temperature of 1700° F.

As follows from Tables 2 and 3, the invented alloy demonstrated superior ductility that allowed manufacturing of welding wire using standard drawing and extrusion processes. The example of the welding wire of 0.045 inch in diameter manufactured of Alloy 1 is shown in FIG. 1.

Despite the superior ductility, yield strength and stress rupture properties of the invented alloy significantly exceeded properties of the standard IN625 alloy due to the formation of fine cuboidal borides uniformly precipitated in a ductile nickel based matrix.

Mechanical properties of bars manufactured of Alloy 1 by plasma arc re-melt and wire in the as manufactured condition in a comparison with mechanical properties of standard AMS 5666 and AMS 5402 INCONEL®625 alloy in forged and cast condition respectively are provided in Table 3 and 4. As follows from this data, the invented alloy demonstrated superior mechanical properties at a room temperature that can be utilized for manufacturing of various articles including turbine engine components.

The weldability test was made using GTAW-MA welding by cladding and welding using welding rods manufactured of the Alloy 1. Cladding was made on the precipitation hardening equiaxed and directionally solidified GTD 111 precipitation hardening superalloy, WGB layer comprised of Mar M247 filler powder and Amdry 775 brazing material deposited to the surface of Inconel 738 substrate and single crystal CMSX-4 material.

GTD 111, WGB and CMSX-4 alloys were selected for a demonstration of superior properties of the invented welding material based on historical poor weldability and wide industrial applications of these materials for manufacturing and repair of various turbine engine components. For example, GTD 111 is highly susceptibility to micro fissuring in the HAZ. GTD 111 has been used for a manufacturing High Pressure Turbine Blades (HPT) of industrial gas turbine engines for decades. Single crystal CMSX-4 material has been used for a manufacturing of HPT blades for aero turbine engines. It is prone to recrystallization and cracking. The WGB materials have been widely used for a repair of turbine engine components. This type of materials is prone to stress—strain cracking due to low ductility.

Figure 2:
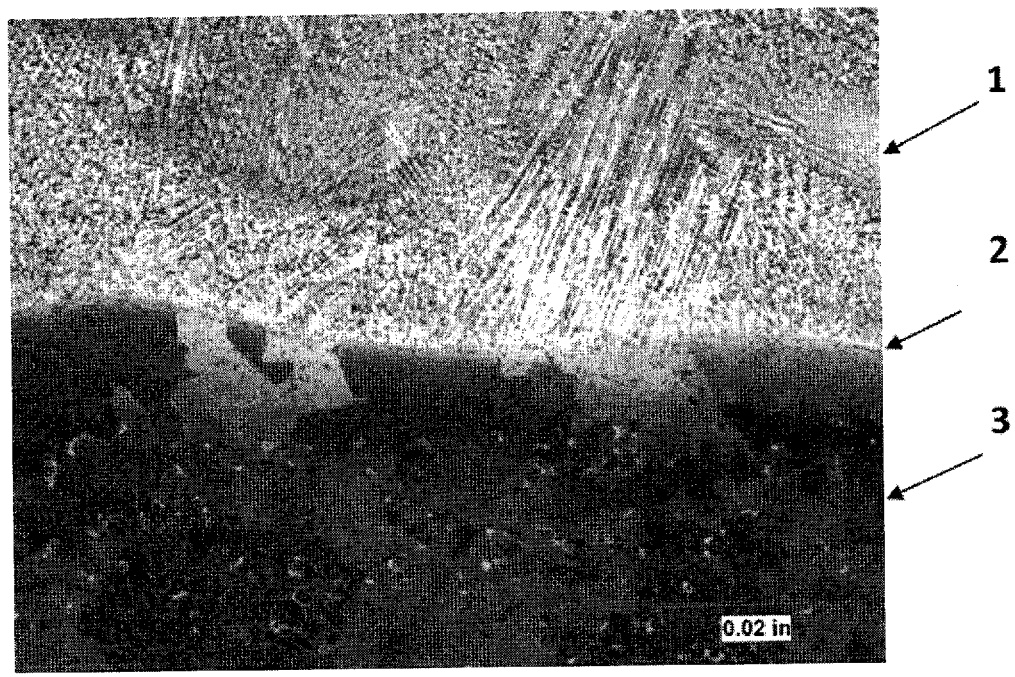
FIG. 2 is the micrograph of the clad weld that was produced on GTD 111 base material using welding rods containing 0.4 wt. % B and 0.02 wt. % C that depicts the crack free HAZ at the bottom and weld build up on the top, wherein 1 is the weld metal, 2 is the fusion line and 3 is the base material manufactured of GTD 111 superalloy.

Welding tests were performed by single and multi-pass cladding on WGB and GTD 111, CMSX-4 samples respectively aiming to produce weld buildup of 4 inch in length, from 0.15 inch to 0.3 inch in width and from 0.080 inch to 0.35 inch in height using GTAW-MA welding process at an ambient temperature. Typical micrograph of clad welds on GTD 111, WGB and CMSX-4 materials in PWHT condition are shown in FIGS. 2, 3 and 4 respectively.

Welding parameters were selected by experiment aiming to produce clad welds with a dilution of 10-15%:
Weld current of (60-70) A
Arc voltage of (13-14) V
Welding speed of (1.0-1.2) inch per minute.

Prior to welding samples, manufacture of GDT 111 alloy, were subjected to a pre-weld annealing heat treatment at a temperature of 2192° F. for two (2) hours followed by an argon quench. Welding on samples manufactured of WGB and CMSX-4 materials was made without pre-weld heat treatment.

After welding samples produced of GTD 111 and WGB material were subjected to the PWHT comprised annealing at a temperature of 2192° F. for two (2) hours followed by an aging at temperatures of 2048° F. for two (2) hours and 1553° F. for twenty four (24) hours. CMSX-4 samples were stress relieve at 2048° F. for one (1) hour.

Acceptable compositions of welding material for welding of nickel based superalloys included those that had sufficient ductility to be drawn into wire and produced crack free welds with yield strength and stress rupture properties exceeding propertied of IN625 at a temperature of 1800° F.

As follows from Table 2, elevated content of carbon in Alloy 3 more than twice reduced elongation within temperature range of 1200-1800° F. and rendered it unable to be drawn into welding wire.

The invented alloy with the chemical composition corresponding to Alloy 1 and Alloy 2 demonstrated superior ductility allowing manufacturing of weld wire using standard drawing and extrusion processes. Also, Alloy 1 had superior stress-rupture properties than standard INCONEL®625 alloy as shown in Table 3 at 1200 and 1800° F. and produced crack free welds on GTD 111, WGB and single crystal CMSX-4 materials as shown in FIGS. 2, 3 and 4 respectively. Also, as shown in Table 4, the invented alloy has superior tensile properties and ductility at room temperature to be considered for manufacturing of turbine engine components and other articles.

TABLE 1

Chemical Composition of Invented Welding Material in Comparison with Standard IN625 Alloy, in Wt. %

| Weld Metal | Ni | Cr | Mo | Nb | B | C | W | Ti | Si | Mn | Fe |
|---|---|---|---|---|---|---|---|---|---|---|---|
| Alloy 1 | To balance | 20 23 | 8 10 | 3.15 4.14 | 0.4 | 0.02 | — | — 0.4 | — 0.5 | — 0.5 | — 5.0 |
| Alloy 2 | To balance | 20 23 | 8 10 | 3.15 4.14 | 0.6 | 0.04 | — | — 0.4 | — 0.5 | — 0.5 | — 5.0 |
| Alloy 3 | To balance | 20 23 | 8 10 | 3.15 4.14 | 0.6 | 0.1 | — | — 0.4 | — 0.5 | — 0.5 | — 5.0 |
| IN625 | To balance | 20 23 | 8 10. | 3.15 4.14 | — | 0.1 | — | — 0.4 | — 0.5 | — 0.5 | — 5.0 |

TABLE 2

High Temperature Tensile Properties of the Invented Alloy in Arc Re-melted Condition

| Weld Metal | Test Temperature, ° F. | 0.2% Offset Yield Strength, KSI | %, Elongation | %, Reduction |
|---|---|---|---|---|
| Alloy 1 | 1200 | 57.6 | 20 | 20.2 |
| Alloy 1 | 1800 | 14.7 | 51.1 | 51.0 |
| Alloy 2 | 1200 | 62.5 | 15.6 | 19.7 |
| Alloy 2 | 1800 | 17.6 | 51.8 | 51.9 |
| Alloy 3 | 1200 | 65.6 | 5.8 | 6.5 |
| Alloy 3 | 1800 | 24.5 | 22.5 | 23.4 |

TABLE 3

Stress Rupture Properties of Plasma Arc Melted Alloy 1 with the Preferable Chemical Composition and Base Line Standard IN625 Alloy

| Material | Test Temperature, ° F. | Stresses, KSI | Rupture Time, Hours |
|---|---|---|---|
| Alloy 1 | 1200 | 67.0 | 47.7 |
| Alloy 1 | 1800 | 8.0 | 7.1 |

TABLE 3-continued

Stress Rupture Properties of Plasma Arc Melted Alloy 1 with the
Preferable Chemical Composition and Base Line Standard IN625 Alloy

| Material | Test Temperature, °F. | Stresses, KSI | Rupture Time, Hours |
|---|---|---|---|
| Alloy 1 | 1800 | 7.0 | 12.2 |
| Inconel 625 | 1200 | 50.5 | 10 |
| Inconel 625 | 1800 | 8.0 | 1.2 |

TABLE 4

Mechanical Properties of Welding Wire Manufactured of the
Invented Alloy 1 with the Preferable Chemical Composition and
Standard Inconel 625 Alloy at a Room Temperature

| Material | UTS, KSI | Yield Strength, KSI | Elongation, % |
|---|---|---|---|
| Alloy 1 Weld Wire | 156 | 75.5 | 35 |
| IN625 as per AMS 5666 | 120 | 60 | 30 |
| IN625 as per AMS 5402 | 76 | 40 | 16 |

TABLE 5

Tensile Properties of Welds Produced Using Welding Wire
Manufactured of Alloy 1 and IN625 Base Line Alloy at 1800° F.

| Material | 0.2% Offset Yield Strength, KSI | UTS, KSI | Elongation, % | RA, % |
|---|---|---|---|---|
| Alloy 1 Clad Weld | 14.6 | 25.4 | 51.8 | 52.4 |
| IN625 Clad Welds | 11.9 | 22.5 | 43.5 | 42.3 |

TABLE 6

Stress-Rupture Properties and Tensile Properties of the Weld Metal
Produced Using Welding Wire Manufactured of Alloy 1 and
IN625 Base Line Alloy

| Material | Test Temperature, °F. | Stresses, KSI | Rupture Time, Hours |
|---|---|---|---|
| Alloy 1 Clad Welds | 1800 | 8.0 | 24.0 |
| IN625 Clad Welds | 1800 | 8.0 | 1.7 |

As follows from Tables 5 and 6, mechanical properties of clad welds that were produced on GTD 111 substrate using GTAW-MA with welding wire manufactured of Alloy 1 exceeded properties of welds produced using standard IN625 welding wire at a temperature of 1800° F.

Therefore, the invented welding material that comprised from about 0.4 wt. % to 0.6 wt. % B and from trace amount to a maximum of 0.04 wt. % C has superior ductility, and produced crack free welds on GTD 111 superalloy, WGB and CMSX-4 single crystal materials with mechanical properties, exceeding properties of the standard IN625 base line alloy at high temperature and allowed manufacturing of the invented welding wire using standard low cost and high productivity drawing and extrusion processes. Standard IN625 alloy does not include boron, however does include some amount of carbides, due to its carbon content. Low carbon content less than 0.04 wt. % C in this alloy is required to exclude formation of carbides. Higher carbon contents from 0.06 wt. % to about 0.1 wt. %, which is normally contained in INCONEL®625, promoted the formation of carbides that reduced ductility and affect ability of the invented material to undergo cold working, wire drawn and forming. This was verified experimentally as evidenced by Alloy 3 in Tables 1 and 2 above.

We claim:

1. A ductile boron bearing nickel based welding material comprising the following elements in weight percentages:
   a) Boron: from 0.4 to 0.6 wt. %
   b) Carbon: from a trace amount to 0.04 wt. %
   c) Chromium: from 20 to 23 wt. %
   d) Molybdenum from 8 to 10 wt. %
   e) Niobium: from 3.15 to 4.14 wt. %
   f) Manganese: from trace amount to 1.5 wt. %, and
   g) Nickel with impurities: to balance;
   wherein the welding material is adapted for joining and repair of alloys having stress rupture properties equal to or exceeding that of baseline standard Inconel 625.

2. The ductile boron bearing nickel based welding material as per claim 1 further including the following elements in weight percentages:
   a) iron from about trace amount to 5 wt. %; and
   b) micro alloying elements selected from among titanium, tantalum, tungsten, and silicon, provided that a combined amount of the micro alloying elements and manganese does not exceed 1.5 wt. %.

3. The ductile boron bearing nickel based welding material as per claim 1 is a wire for welding and brazing.

4. The ductile boron bearing nickel based welding material as per claim 1 is a powder for welding and brazing.

5. The ductile boron bearing nickel based welding material as per claim 1 is a foil for brazing and diffusion bonding.

6. The ductile boron bearing nickel based welding material as per claim 1 is used for welding and brazing of a polycrystalline nickel, cobalt and iron based alloys.

7. The ductile boron bearing nickel based welding material as per claim 1 is used for welding and brazing directionally solidified nickel, cobalt and iron based alloys.

8. The ductile boron bearing nickel based welding material as per claim 1 is used for welding and brazing of single crystal nickel, cobalt and iron based materials.

9. The ductile boron bearing nickel based welding material as per claim 1 is used for TIG brazing and welding of composite materials.

10. The ductile boron bearing nickel based welding material as per claim 1 is used for a repair of an article produced by welding and brazing.

11. The ductile boron bearing nickel based welding material as per claim 1 being substantially free of Si.

12. The ductile boron bearing nickel based welding material as per claim 1 being substantially free of Sn.

13. The ductile boron bearing nickel based welding material as per claim 1 being substantially free of Si and Sn.

* * * * *